(12) United States Patent
Baubet

(10) Patent No.: US 9,702,410 B2
(45) Date of Patent: Jul. 11, 2017

(54) MACHINE ARRANGEMENT

(71) Applicant: AKTIEBOLAGET SKF, Göteborg (SE)

(72) Inventor: Yannick Baubet, Leiden (FR)

(73) Assignee: AKTIEBOLAGET SKF, Gothenburg (SE)

( * ) Notice: Subject to any disclaimer, the term of this patent is extended or adjusted under 35 U.S.C. 154(b) by 114 days.

(21) Appl. No.: 14/653,603

(22) PCT Filed: Dec. 20, 2012

(86) PCT No.: PCT/EP2012/005291
§ 371 (c)(1),
(2) Date: Jun. 18, 2015

(87) PCT Pub. No.: WO2014/094801
PCT Pub. Date: Jun. 26, 2014

(65) Prior Publication Data
US 2015/0377295 A1 Dec. 31, 2015

(51) Int. Cl.
*F16N 27/00* (2006.01)
*F01M 9/00* (2006.01)
*B23Q 11/12* (2006.01)
*F16C 19/00* (2006.01)
*F16C 33/66* (2006.01)
*F16C 3/14* (2006.01)
(Continued)

(52) U.S. Cl.
CPC ............ *F16C 33/6674* (2013.01); *F16C 3/14* (2013.01); *F16C 19/46* (2013.01); *F16C 19/525* (2013.01); *F16C 2361/91* (2013.01)

(58) Field of Classification Search
CPC .... F16C 33/6674; F16C 33/667; F16N 7/385; F16N 2270/30; F02B 2075/025
USPC ................... 184/6.1, 6.14, 7.4; 384/471, 473
See application file for complete search history.

(56) References Cited

U.S. PATENT DOCUMENTS 2,944,857 A * 7/1960 Schneider ............... F16C 19/54
384/475
3,195,965 A * 7/1965 Van Dorn ........... F16C 33/6662
384/475
(Continued)

FOREIGN PATENT DOCUMENTS

DE 102010015519 A1 10/2011
DE 102010019974 A1 11/2011
FR 1346823 A 12/1963

*Primary Examiner* — Henry Liu
(74) *Attorney, Agent, or Firm* — Bryan Peckjian; SKF USA Inc. Patent Dept.

(57) ABSTRACT

A machine arrangement comprising a crankshaft which is supported by at least one roller bearing including bearing rings and roller elements between the bearing rings, wherein the roller bearing is connected with a device for delivering of a lubricant to the area of rolling contact between the bearing rings and the roller elements. To improve the supply of lubricant to the roller bearing and to supply the right amount of lubricant in dependence of the temperature of the roller bearing, the device for delivering of the lubricant comprises a lubricant reservoir and a flow path from the lubricant reservoir to the area of rolling contact, wherein a valve element is arranged in the flow path for controlling at least one of a flow of lubricant and a pressure of lubricant in dependence of the temperature of at least one of the roller bearing and the valve element.

9 Claims, 2 Drawing Sheets

(51) Int. Cl.
 *F16C 19/46* (2006.01)
 *F16C 19/52* (2006.01)

(56) References Cited

U.S. PATENT DOCUMENTS

| | | | | |
|---|---|---|---|---|
| 3,240,541 A * | 3/1966 | Levesque | F16C 32/0629 | 384/321 |
| 3,480,342 A * | 11/1969 | Venable | F16C 33/32 | 384/476 |
| 3,582,928 A * | 6/1971 | Gaertner | G01K 7/021 | 340/522 |
| 4,312,546 A * | 1/1982 | Bayer | D07B 7/06 | 384/470 |
| 4,320,724 A * | 3/1982 | Takada | F02B 75/18 | 123/196 R |
| 4,334,713 A * | 6/1982 | Dauvergne | B60T 13/141 | 303/54 |
| 4,354,183 A * | 10/1982 | Weeks | F16C 33/1085 | 340/449 |
| 4,505,071 A * | 3/1985 | Schwar | B24B 5/42 | 451/163 |
| 4,632,223 A * | 12/1986 | Maurer | F16N 29/04 | 184/108 |
| 4,969,430 A * | 11/1990 | Masuda | F01M 1/04 | 123/196 R |
| 5,052,355 A * | 10/1991 | Ito | F01M 1/02 | 123/196 R |
| 5,192,139 A * | 3/1993 | Hiramoto | B23Q 1/70 | 384/475 |
| 5,203,228 A * | 4/1993 | Miyawaki | F16C 9/04 | 123/197.4 |
| 5,253,985 A * | 10/1993 | Ruetz | F01D 25/164 | 384/473 |
| 5,711,615 A * | 1/1998 | Stitz | F16C 27/045 | 384/471 |
| 5,971,107 A * | 10/1999 | Stitz | F16C 27/045 | 184/108 |
| 6,105,724 A * | 8/2000 | Stitz | F16C 27/045 | 184/108 |
| 6,172,436 B1 * | 1/2001 | Subler | F16C 33/6662 | 29/898.11 |
| 6,261,003 B1 * | 7/2001 | Dusserre-Telmon | F16C 33/58 | 384/475 |
| 6,273,051 B1 * | 8/2001 | Paty | F01M 1/06 | 123/196 R |
| 6,293,703 B1 * | 9/2001 | Date | F16C 25/08 | 384/476 |
| 6,324,899 B1 * | 12/2001 | Discenzo | F16C 19/52 | 340/631 |
| 6,357,922 B1 * | 3/2002 | Harbottle | F16C 19/163 | 384/466 |
| 6,623,251 B2 * | 9/2003 | Nawamoto | B23Q 1/70 | 184/6.14 |
| 6,705,431 B2 * | 3/2004 | Matsuura | F16C 33/6625 | 184/39.1 |
| 6,913,390 B2 * | 7/2005 | Inoue | B23Q 1/40 | 384/321 |
| 6,994,473 B2 * | 2/2006 | Nishibata | F16N 37/003 | 184/7.4 |
| 7,000,734 B2 * | 2/2006 | Nawamoto | B23Q 1/70 | 184/6.26 |
| 7,080,620 B2 * | 7/2006 | Aronsson | F01M 1/04 | 123/196 R |
| 7,198,020 B1 * | 4/2007 | Beddick | F01M 1/08 | 123/196 R |
| 7,883,271 B2 * | 2/2011 | Suzuki | F16C 19/14 | 384/462 |
| 7,934,871 B2 * | 5/2011 | Kawaguchi | F16C 19/182 | 384/474 |
| 8,002,473 B2 * | 8/2011 | Becker | F16C 9/04 | 384/130 |
| 8,051,826 B2 * | 11/2011 | Allen | F01M 1/08 | 123/196 R |
| 8,753,016 B2 * | 6/2014 | Matsuyama | B23Q 11/122 | 384/471 |
| 8,757,028 B2 * | 6/2014 | Broughton | F01M 1/06 | 123/196 R |
| 8,920,037 B2 * | 12/2014 | Paluncic | F16C 33/6625 | 384/466 |
| 9,146,006 B2 * | 9/2015 | Kreutzkamper | F16N 7/385 | |
| 2004/0041119 A1 * | 3/2004 | Christen | G05D 16/0647 | 251/331 |
| 2004/0055825 A1 * | 3/2004 | Fuerst | F16C 32/0644 | 184/5 |
| 2005/0022775 A1 * | 2/2005 | Aronsson | F01M 1/04 | 123/196 R |
| 2008/0078620 A1 * | 4/2008 | Yanohara | B23Q 11/14 | 184/6.14 |
| 2008/0202465 A1 * | 8/2008 | Allen | F01M 1/08 | 123/196 R |
| 2009/0250027 A1 * | 10/2009 | Schafer | F01L 1/46 | 123/90.17 |
| 2010/0221128 A1 * | 9/2010 | Mellar | F04B 39/06 | 417/410.1 |
| 2010/0233006 A1 * | 9/2010 | Yamamoto | F04C 18/16 | 418/206.3 |
| 2010/0296762 A1 * | 11/2010 | Waseda | F16F 15/267 | 384/548 |
| 2012/0006011 A1 * | 1/2012 | Allen | F01M 1/08 | 60/287 |
| 2012/0247876 A1 * | 10/2012 | Kreutzkamper | F16N 7/385 | 184/26 |

\* cited by examiner

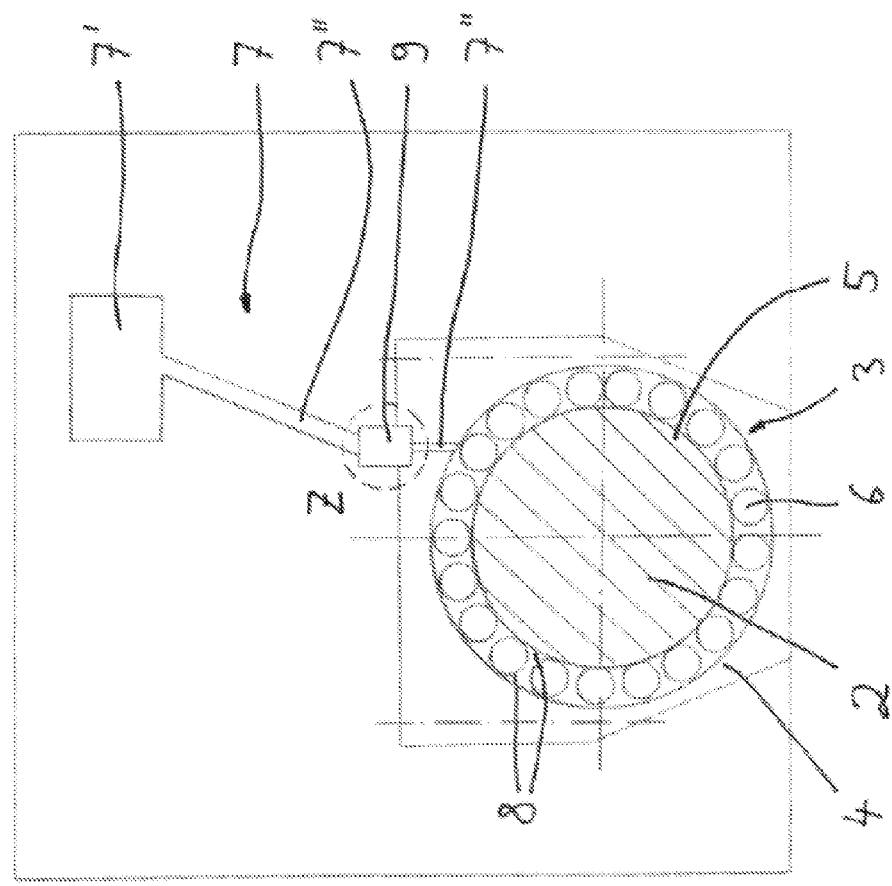

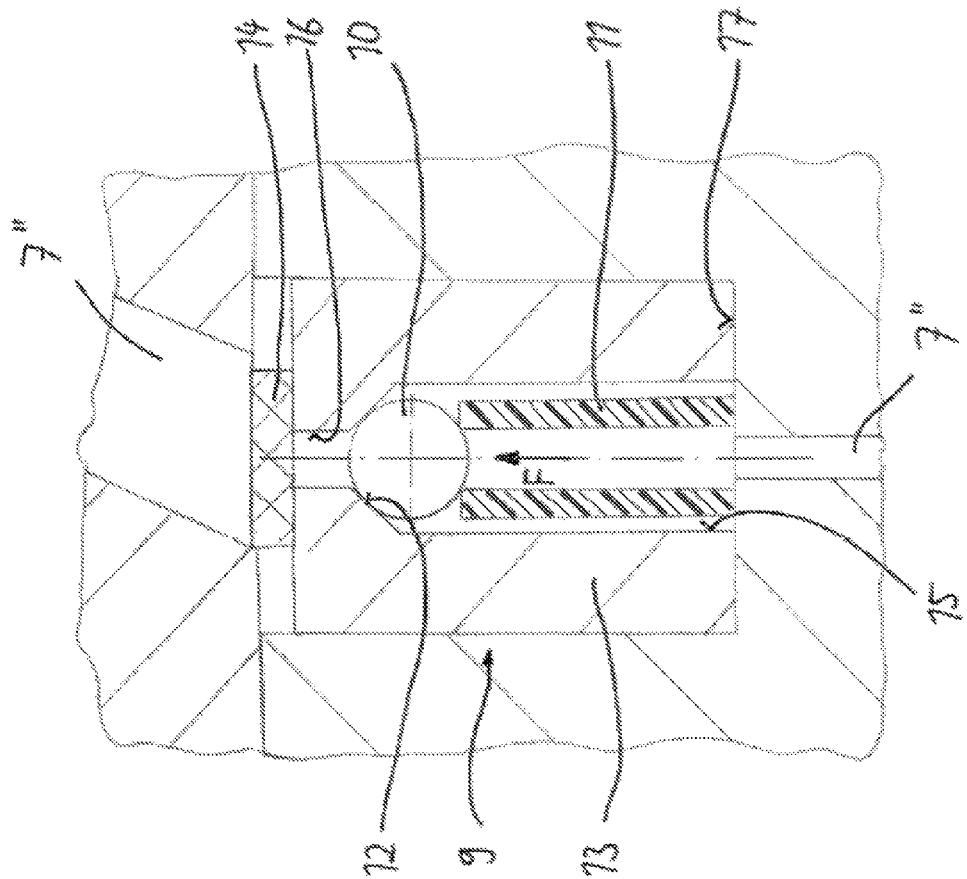

MACHINE ARRANGEMENT

CROSS REFERENCE TO RELATED APPLICATIONS

This is a United States National Stage application claiming the benefit of International Application Number PCT/EP2012/005291 filed on 20 Dec. 2012, which is incorporated herein by reference in its entirety.

TECHNICAL FIELD

The invention relates to a machine arrangement comprising a crankshaft which is supported by at least one roller bearing with bearing rings and roller elements between the bearing rings, wherein the roller bearing is connected with a device for delivering lubricant to the area of rolling contact between the bearing rings and the roller elements.

BACKGROUND

Some machine arrangements, like especially combustion engines, comprise a crankshaft which must be supported in an engine housing by means of bearings. Roller bearings can be employed for this task. To maintain good operation conditions it must be made sure that the roller bearing is supplied with a sufficient amount of lubricant, normally oil. While too little oil can result in damage of the roller bearing, it is also detrimental when too much oil is supplied to the bearing. The right amount of lubricant also depends on the temperature of the machine element and specifically of the bearing. If the bearing becomes warmer it is beneficial to increase the flow of lubricant to the bearing.

Thus, it is an object of the present invention to propose a machine arrangement of the kind mentioned above which allows a supply of lubricant to the roller bearing which is optimized specifically with respect to the actual temperature of the bearing.

SUMMARY OF THE INVENTION

A solution according to the invention is characterized in that the device for delivering of the lubricant comprises a lubricant reservoir and a flow path from the lubricant reservoir to the area of rolling contact, wherein a valve element is arranged in the flow path for controlling the flow and/or pressure of lubricant in dependence of the temperature of the roller bearing and/or the valve element.

The valve element is preferably designed in such a manner to increase the flow and/or the pressure of lubricant with rising temperature of the roller bearing and/or the valve element.

The valve element can comprise a flow restriction element which is biased by a spring element, wherein the spring force of the spring element which is exerted onto the flow restriction element is dependent on the temperature of the roller bearing and/or the valve element.

The flow restriction element can be a ball which cooperates with a seat which is machined into a valve housing. The seat can have a conical surface.

The spring element consists according to a preferred embodiment of the invention of a material which has a coefficient of thermal expansion which is different from the coefficient of thermal expansion of the surrounding part. Specifically, the coefficient of thermal expansion of the mentioned material is different from the coefficient of thermal expansion of steel.

The spring element can also consist of a material which experiences a drop of its Young's modulus of at least 15% when the material is heated up from 20° C. to 250° C. That is, the material becomes significantly less stiff when it is heated up—compared with steel.

Here, a preferred material is an elastomer material, from which the spring element is made and which has the mentioned properties.

The spring element can be designed as a sleeve with a hollow-cylindrical geometry, wherein the ball (restriction element) is arranged at one axial end of the spring element.

A filter element can be arranged in the flow path. The filter element is preferably arranged upstream of the valve element; specifically it can be arranged at one end of the valve housing.

The lubricant is preferably oil. The lubricant reservoir is preferably the main oil gallery of the machine arrangement.

In a particularly preferred embodiment, the machine arrangement is a combustion engine.

By the proposed concept it becomes possible to improve the supply of lubricant to the roller bearing and specifically to supply the right amount of lubricant in dependence of the temperature of the roller bearing.

The arrangement has a stable construction so that—after adjustment of the different elements of the device—a reliable temperature-controlled lubricant flow is guaranteed.

Thus, the invention provides a lubrication control system for a crankshaft bearing being a rolling element bearing. The bearing is lubricated with engine oil, which is supplied from the main oil gallery via a channel (flow path). A valve is provided in the channel for controlling the oil flow and oil pressure respectively. The valve is temperature-sensitive, to increase oil flow at high temperatures. For example, the valve can be executed with a spring with a spring stiffness that varies with the temperature.

BRIEF DESCRIPTION OF THE DRAWINGS

The drawings show an embodiment of the invention.

FIG. 1 shows a schematic front view of a combustion engine with its crankshaft and FIG. 2 shows detail "Z" according to FIG. 1.

DETAILED DESCRIPTION OF THE INVENTION

In FIG. 1 a machine arrangement 1 being a combustion engine is shown. The combustion engine 1 has a crankshaft 2 which is supported by a plurality of roller bearings; only one of the roller bearings 3 is depicted in a sectional front view in FIG. 1 (the axis of the crankshaft is perpendicular to the paper plane).

The roller bearing 3 has an outer bearing ring 4 and an inner bearing ring 5. Between the bearing rings 4, 5 roller elements 6 are arranged, which are cylindrical rollers in the present embodiment.

During the operation of the combustion engine 1 the temperature varies in dependence of the load situation of the engine. Thus, the temperature of the roller bearing 3 varies as well and respectively.

To supply the roller bearing 3 with a sufficient amount of lubricant, i. e. oil in the present embodiment, the combustion engine 1 is equipped with a device 7 for delivering oil to the roller bearing 3. The device 7 comprises a lubricant reservoir 7' which is the main oil gallery of the combustion engine and a flow path 7" which extends from the oil gallery 7' to the region of the rolling contact 8 between the roller elements 6 and the raceways of the bearing rings 4, 5.

For controlling the flow rate of oil into the region of rolling contact 8 and/or for controlling the pressure of the oil accordingly a valve element 9 is arranged in the flow path 7" before the flow path 7" ends in the region of the rolling contact 8.

The valve element 9 is designed in such a manner that the flow rate through the flow path 7" is controlled such that more oil flows when the temperature of the roller bearing 3 and thus the temperature of the valve 9 (which is arranged adjacent to the roller bearing 3) gets higher. On the other hand, the flow rate is reduced when the temperature of the roller bearing 3 and thus of the valve element 9 is falling.

A valve element 9 which has this property is shown as an example in FIG. 2.

The valve element 9 has a valve housing 13. In the housing 13 first and second coaxial bores 15 and 16 are machined. The first bore 15 has a bigger diameter than the second bore 16. The transition zone between the two bores 15, 16 is formed by a seat 12, which has a conical surface. In the first bore 15, a ball 10 is arranged which forms a restriction element for the flow rate which passes the flow path 7".

An end section of the ball 10, which is remote from the second bore 16, is arranged on a spring element, which is a sleeve 11 with a hollow-cylindrical base geometry. When the arrangement is assembled, the lower end of the sleeve 11 lies flush with a mounting plane 17 of the housing element of the bearing. That is, due to the geometry of the first and second bores 15, 16, the seat 12, the ball 10 and the sleeve 11 forming the spring element, the ball is pressed with a certain spring force F onto the seat 12. So, the flow of oil through the flow path 7" and the respective oil pressure is restricted.

The material of the sleeve 11 is chosen in such a way that the Young's modulus (i. e. the elastic modulus in N/mm2) falls quite significantly when the material is warmed up. A material is preferred—specifically an elastomer material—which exhibits a drop in the elastic modulus of at least 15% when the material is warmed up from room temperature (20° C.) to 250° C.

Due to this effect, the spring force F drops accordingly when the valve element 9 is getting warmer. Consequently, the ball 10 is then pressed with less force against the seat 12, so that more oil can pass the flow path 7"; the flow rate is thus rising.

To make sure that no contaminants reach the rolling contact region 8 a filter element 14 is arranged in the flow path 7" just before the valve housing 13.

Of course, also other designs are possible to obtain the desired behavior of the valve element 9, i. e. that the flow rate rises with rising temperatures of the bearing 3 and the valve element 9 respectively.

For example the coefficient of thermal expansion can be used to modify the opening between the ball 10 and the seat 12. As the coefficient of thermal expansion is bigger for elastomer materials than for steel, it is necessary in this case to choose another design concept. For example it is possible that a thermally expanding elastomeric element presses the annular gap between the ball 10 and the seat 12 open against an elastic steel spring acting on the ball to enlarge the flow rate in the flow path 7".

REFERENCE NUMERALS

Ref. No. Description
1 Machine arrangement
2 Crankshaft
3 Roller bearing
4 Bearing ring (outer ring)
5 Bearing ring (inner ring)
6 Roller elements
7 Device for delivering of a lubricant
7' Lubricant reservoir
7" Flow path
8 Rolling contact
9 Valve element
10 Restriction element (ball)
11 Spring element
12 Seat
13 Valve housing
14 Filter element
15 First bore
16 Second bore
17 Mounting plane
F Spring force

The invention claimed is:

1. A machine arrangement comprising a crankshaft which is supported by at least one roller bearing with bearing rings and roller elements between the bearing rings,
   wherein the roller bearing is connected with a device for delivering a lubricant to an area of rolling contact between the bearing rings and the roller elements,
   a lubricant reservoir integral with the device for delivering of the lubricant;
   a flow path from the lubricant reservoir to the area of rolling contact integral with the device for delivering of the lubricant, and
   a valve element arranged in the flow path wherein the valve element is adapted for controlling at least one of a flow of lubricant and a pressure of lubricant in dependence of a temperature of at least one of the roller bearing and the valve element, the valve element comprising a valve housing defining an opening to a first bore therein such that the opening is located at an upstream end of the first bore, the flow path traversing the valve housing through the opening and the first bore,
   a filter disposed in the flow path upstream of and in contact with the valve housing so as to cover the opening therein, wherein the filter substantially prevents any non-lubricant material from entering the opening of the valve housing,
   the valve element further comprising a flow restriction element which is biased by a spring element, the spring element biasing the flow restriction element proximate to a downstream end of the first bore, wherein a spring force of the spring element, which is exerted onto the flow restriction element, is dependent on the temperature of the at least one of the roller bearing and the valve element such that the at least one of the flow of lubricant and the pressure of lubricant is varied upon changes of the temperature without reliance on any sensor data.

2. The machine arrangement according to claim 1, wherein the valve element is designed to increase the at least one of the flow of the lubricant and the pressure of the lubricant with rising temperature of the at least one of the roller bearing and the valve element.

3. The machine arrangement according to claim 1, wherein the flow restriction element is a ball which cooperates with a seat wherein the seat is machined into the valve housing.

4. The machine arrangement according to claim 3, wherein the seat has a conical surface.

5. The machine arrangement according to claim 1, wherein the spring element consists of a material which has a coefficient of thermal expansion which is different from the coefficient of thermal expansion of surrounding parts of the valve element.

6. A machine arrangement comprising a crankshaft which is supported by at least one roller bearing with bearing rings and roller elements between the bearing rings,
- wherein the roller bearing is connected with a device for delivering a lubricant to an area of rolling contact between the bearing rings and the roller elements,
- a lubricant reservoir integral with the device for delivering of the lubricant;
- a flow path from the lubricant reservoir to the area of rolling contact integral with the device for delivering of the lubricant, and
- a valve element arranged in the flow path wherein the valve element is adapted for controlling at least one of a flow of lubricant and a pressure of lubricant in dependence of a temperature of at least one of the roller bearing and the valve element, the valve element further comprising a flow restriction element which is biased by a spring element, wherein a spring force of the spring element, which is exerted onto the flow restriction element, is dependent on the temperature of at least one of the roller bearing and the valve element, wherein the flow restriction element is a ball which cooperates with a seat wherein the seat is machined into a valve housing,
- wherein the spring element is designed as a sleeve with a hollow-cylindrical geometry, and
- wherein the ball is arranged at one axial end of the spring element.

7. The machine arrangement according to claim 1, wherein the lubricant is oil.

8. The machine arrangement according to claim 7, wherein the lubricant reservoir is a main oil gallery of the machine arrangement.

9. The machine arrangement according to claim 1, wherein the machine arrangement is a combustion engine.

\* \* \* \* \*